United States Patent [19]

Chabries et al.

[11] Patent Number: 4,977,604

[45] Date of Patent: Dec. 11, 1990

[54] METHOD AND APPARATUS FOR PROCESSING SAMPLED DATA SIGNALS BY UTILIZING PRECONVOLVED QUANTIZED VECTORS

[75] Inventors: Douglas M. Chabries, Salem; Richard W. Christiansen, Highland, both of Utah

[73] Assignee: Unisys Corporation, Blue Bell, Pa.

[21] Appl. No.: 157,199

[22] Filed: Feb. 17, 1988

[51] Int. Cl.$^5$ .............................................. G06K 9/64
[52] U.S. Cl. ......................................... 382/42; 382/34
[58] Field of Search ........................ 382/1, 34, 42, 48

[56] References Cited

U.S. PATENT DOCUMENTS

| | | | |
|---|---|---|---|
| 4,025,920 | 5/1977 | Reitboeck et al. | 382/34 |
| 4,200,861 | 4/1980 | Hubach et al. | 382/34 |
| 4,400,828 | 8/1983 | Pirtz et al. | 382/34 |
| 4,776,020 | 10/1988 | Kosaka et al. | 382/1 |

OTHER PUBLICATIONS

S. A. Hovanessian, Synthetic Array and Imaging Radars, Artech House, 1980, pp. 13–146.
R. O. Harger, Synthetic Aperture Radar Systems, Academic Press, 1970, pp. 1–82.
Merrill I. Skolnik, Radar Handbook, McGraw-Hill, 1970, pp. 23-1 to 23-25.
Dale A. Ausherman, Digital vs. Optical Techniques in Synthetic Aperture Radar Data Processing, Application of Digital Image Processing, vol. 119 (IOCC 1977).
R. E. Williams, Creating an Acoustic Synthetic Aperture in the Ocean, Journal of the Acoustical Society of America, vol. 60, No. 1, Jul. 1976.
A. V. Oppenheim, R. W. Schafer, Digital Signal Processing, Prentice-Hall, Englewood Cliffs, N.J., 1975, pp. 113–116.
J. Makhoul, S. Roucos, H. Gish, Vector Quantization in Speech Coding, Proceedings of the IEEE, vol. 73, No. 11, Nov. 1985, pp. 1551–1588.
Robert M. Gray, "Vector Quantization", IEEE ASSP Magazine, pp. 4–29, Apr. 1984.
R. L. Baker, R. M. Grey, Image Compression Using Non-Adaptive Spatial Vector Quantization, Proceedings 16th Asilomar Conference on Circuits, Systems, and Computers, 1982.
S. E. Budge, R. L. Baker, Compression of Color Digital Images Using Vector Quantization in Product Codes, Proceedings of IEEE, ICASSP, Mar. 1985.
V. S. Frost, G. J. Minden, A Data Compression Technique for Synthetic Radar Images, IEEE Transactions on Aerospace and Electronic Systems, vol. AES-22, No. 1, Jan. 1986.
W. H. Chen, C. H. Smithy, "Adaptive Coding of Monochrome and Color Images," IEEE Transactions, vol. COM-25, pp. 1285–1292, Nov. 1977.
A. Habibi, "Hybrid Coding of Pictorial Data," IEEE Transactions, vol. COM-22, No. 5, pp. 614–623, May 1974.
A. M. Netravali, "On Quantizers for DPCM Coding of Picture Signals," IEEE Transactions, vol. IT-23, No. 3, pp. 360–370, May 1977.

Primary Examiner—David K. Moore
Assistant Examiner—Jose L. Couso
Attorney, Agent, or Firm—Charles J. Fassbender; Mark T. Starr

[57] ABSTRACT

An electronic system for processing sampled data input signals includes an electronic memory which stores a set of preprocessed vectors $V_1f(m,...)$ thru $V_N*f(m,...)$ where $f(m,...)$ is a sampled data function, having any number of dimensions m, .... * is a convolution operator, and $V_1$ thru $V_N$ are a finite set of N unprocessed vectors each of which represents an anticipated group of input signal samples. After these preprocessed vectors are stored, input signals are processed in real time by (a) a circuit which samples the input signal; (b) a circuit which compresses the sequence of samples that is taken into a smaller sequence of index signals that correspond to the indexes 1 thru N of the unprocessed vectors; (c) a circuit which receives the smaller sequence of index signals and reads from the memory those preprocessed vectors whose indexes match the received index signals; and (d) a circuit which adds together the read preprocessed vectors while maintaining a predetermined offset between them as they are added.

17 Claims, 4 Drawing Sheets $$\text{eq. 2} \sim f_1(m) = \text{Rect}\left\{\frac{mT}{\tau}\right\} e^{-j\pi \dot{f}(mT)^2}$$

$\tau, T, \pi, \dot{f} = \text{constants}$ $\text{rect} = 0 \text{ if } |\{\ \}| > \frac{1}{2}, = 1 \text{ if } |\{\ \}| \leq \frac{1}{2}$ eq.3 ~ $f_2(n) = \text{rect}\left\{\dfrac{n}{\dfrac{\lambda(r_0+m\Delta r)}{2(\Delta a)^2}}\right\} e^{j\frac{4\pi}{\lambda}\left[\sqrt{(r_0+m\Delta r)^2+(n\Delta a)^2} - (r_0+m\Delta r)\right]}$ $\lambda_1, r_0, \Delta r, \Delta a, \pi = \text{constants}$

METHOD AND APPARATUS FOR PROCESSING SAMPLED DATA SIGNALS BY UTILIZING PRECONVOLVED QUANTIZED VECTORS

BACKGROUND OF THE INVENTION

This invention, in general, relates to methods and apparatus for processing sampled data signals; and more particularly, it relates to ground mapping methods and apparatus which are used in synthetic aperture radar.

Conventionally, to form a ground map via synthetic aperture radar, an airplane flies over the ground that is to be mapped and transmits a sequence of radar pulses at the ground. Return radar signals from the transmitted pulses are sampled in the airplane; those samples are then compressed in the airplane via various data compression techniques; and the compressed data is then transmitted from the airplane to a receiving station on the ground. Alternatively, the original uncompressed samples are sent to the ground station. Data compression is performed to reduce the amount of information that needs to be transmitted, and thereby reduce the bandwidth of the transmission channel.

If the compressed data is received in the ground station, it is then decompressed in order to reconstruct, to close approximation, the original data samples. Then, the reconstructed data samples, or the original samples if sent in uncompressed form, are further processed by fast Fourier transform methods (FFT methods) and inverse FFT methods in order to produce the ground map. Alternatively, the reconstructed data samples or original data samples are convolved with a sampled data function in order to produce the ground map.

A problem, however, with these prior art mapping procedures is that they are very complicated, and thus very slow to carry out. Particularly time-consuming are the steps of processing the reconstructed or original data samples via an FFT, inverse FFT, or convolution operation. Such operations, when performed by a computer, require scores of floating point multiplications and floating point additions.

Accordingly, a primary object of this invention is to provide an improved method and apparatus for forming visual images via radar, such as ground mapping, by which the complexity and time for forming such images is greatly reduced.

Also, another more general object of the invention is to provide a fast yet simple method and apparatus for processing a sampled data input signal of any source, radar or nonradar.

BRIEF SUMMARY OF THE INVENTION

In accordance with one preferred method via the present invention, visual images in a synthetic aperture radar system are formed by the following steps. Initially, before any radar signals are sent, a finite set of preprocessed vectors $V_1*f(m,n)$, $V_2*f(m,n)$, ... $V_N*f(m,n)$ are stored in an electronic memory M. Here, $V_1, V_2, \ldots V_N$ are respective unprocessed vectors, each of which represents an anticipated group of data samples from the radar return signal; $f(m,n)$ is a two-dimensional sampled data function with variations in each of two dimensions as represented by m and n; and * is a convolution operator.

Subsequently, a sequence of spaced apart radar pulses is transmitted from a flying object; and a return signal from the transmitted pulses is sampled. Those return signal samples are ordered in an array; and that array is then compressed into a smaller array of indexes in which each index i identifies one of the unprocessed vectors $V_1, V_2, \ldots V_N$. Thereafter, those preprocessed vectors whose indexes i match the indexes in the array of indexes are read from the memory M, and the read preprocessed vectors are added together while maintaining a predetermined offset between them as they are added. Visual images are formed by sending the result of the offset additions to a CRT display.

Thus with the disclosed method, no FFT operation or convolution operation is performed in real time on any radar return signal samples or their decompressed counterparts. In fact, no data decompression occurs at all, and no multiplications occur at all. In the disclosed method, only data compression and offset additions occur in real time. Consequently, the return signal samples can readily be processed as fast as they are accumulated.

BRIEF DESCRIPTION OF THE DRAWINGS

Various features and advantages of the invention are described herein in conjunction with the accompanying drawings wherein.

DETAILED DESCRIPTION OF THE INVENTION

Figure 1:
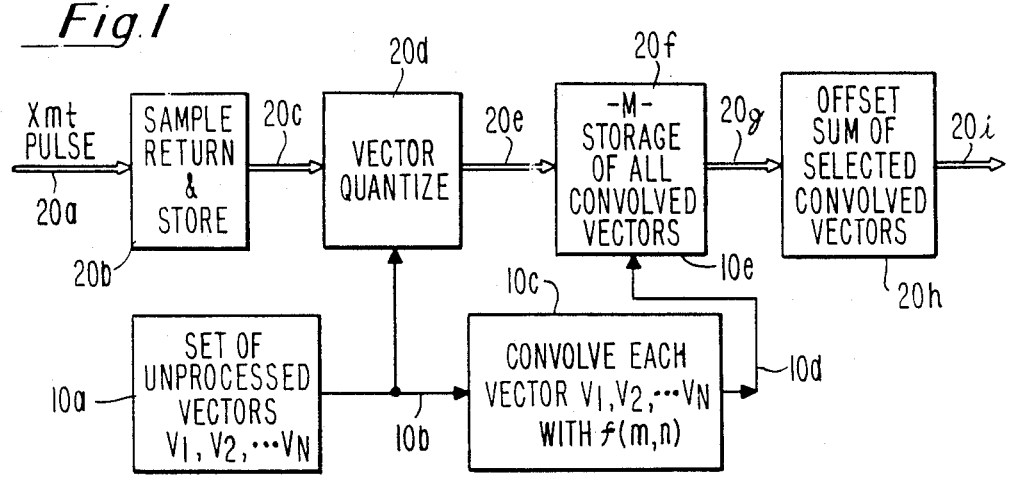
FIG. 1 shows an overview of a preferred method of forming visual images in accordance with the invention.

Referring now to FIG. 1, an overview of a preferred method for forming visual images via radar in accordance with the invention will be described. Additional details of each step in the FIG. 1 method, as well as apparatus for performing that method, will subsequently be described in conjunction with FIGS. 2–10.

Initially in the FIG. 1 method, a finite set of preprocessed vectors $V_1*f(m,n)$, $V_2*f(m,n)$, ... $V_N*f(m,n)$ are stored in an electronic memory M. This step is indicated by reference numerals 10a thru 10e. There, the symbols $V_1, V_2, \ldots V_N$ are respective unprocessed vectors, each of which represents a group of anticipated data samples, $f(m,n)$ is a two-dimensional sampled data function with variations in each of two dimensions as represented by m and n, and * is a convolution operator.

Forming and storing the preprocessed vectors $V_1*f(m,n)$, $V_2*f(m,n)$, ... $V_N*f(m,n)$ is performed just one time. That step is done first in preparation for the remaining steps of the FIG. 1 process. Additional details on this forming and storing step 10a–10e, including a specific example, are described herein in conjunction with FIGS. 4, 6 and 7.

All the remaining steps of the FIG. 1 process are indicated by reference numerals 20a thru 20i. To begin, a sequence of spaced-apart radar pulses is transmitted from a flying object such as an airplane or a satellite. This is indicated by reference numeral 20a. Then, in the time interval following each of the spaced-apart pulses, a return signal is motion compensated, frequency shifted, and sampled multiple times. Each such sample can be a real or complex number. Those samples of the return signal are arranged in an array. All of this is indicated by reference numeral 20b. Samples of the return signal from one pulse make up one row of the array; samples of the return signal from the next pulse make up the next row of the array; etc.

As the array of samples is accumulated, it is converted into a smaller array of indexes in which each index i identifies one of the unprocessed vectors $V_1, V_2, \ldots V_N$. This conversion step is called vector quantization.

During vector quantization, a group of adjacent samples in the sample array is compared to each of the unprocessed vectors $V_1, V_2, \ldots V_N$. This is done to determine which of the vectors $V_1, V_2, \ldots V_N$ most closely matches the group of samples from the sample array. Additional details of this step are described herein in conjunction with FIGS. 3, 4 and 5.

Once the most closely matching vector $V_i$ is found, its index i is utilized to read from the electronic memory M that previously stored preprocessed vector $V_i*f(m,n)$ which has the same index i. This step is indicated in FIG. 1 by reference numerals 20e, 20f, and 20g. One such readout occurs for each vector quantization operation that occurs.

Then, to complete the FIG. 1 method, those preprocessed vectors which are read from memory M are added together in a predetermined fashion during which a certain offset is maintained between them. This is indicated by reference numeral 20i. Further details of this offset addition step are described herein in conjunction with FIGS. 8 thru 10. And, it is the result of this offset addition which forms a visual image on a CRT screen.

Figure 2:
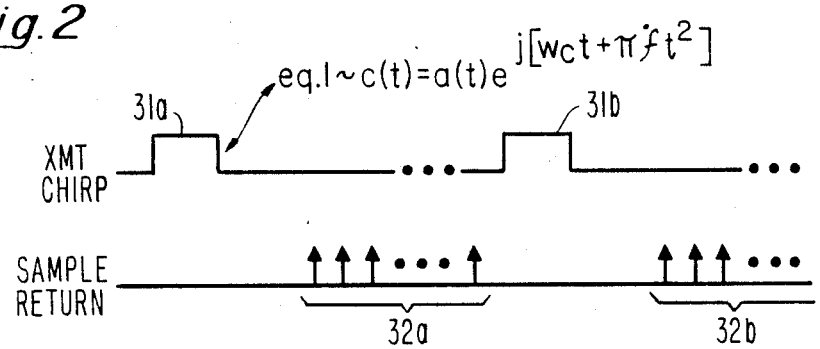
FIG. 2 shows the details of a transmit and sample step in the method of FIG. 1.

Turning now to FIG. 2, additional details on the transmit and sample steps of the FIG. 1 process will be described. In FIG. 2, reference numerals 31a and 31b indicate two of the spaced-apart pulses that are transmitted; and reference numerals 32a and 32b indicate the corresponding samples that are taken of the return signals.

Those pulses which are transmitted can have any predetermined shape and repetition rate. For example, each transmitted pulse can be a modulated chirp of the form given by Eq. 1 in FIG. 2. Suitably, the carrier frequency $f_c$ is 9.35 GHz, the chirp length is 2.7 microseconds; the repetition rate is one chirp per 15 microseconds; and the chirp rate is 33.33 megahertz per microsecond. Similarly, the return signal can be sampled at any predetermined rate, such as one sample every 10 nanoseconds.

Figure 3:
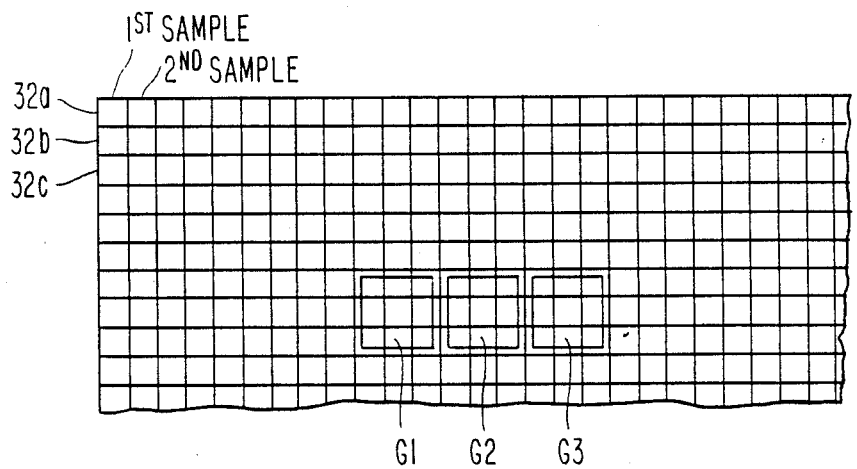
FIG. 3 shows the details of a sample array that is formed during the method of FIG. 1.

Considering next FIG. 3, it shows the details of how the samples of the return signal are arranged in an array. All of the samples 32a lie in the order in which they were taken along the first row of the array; all of the samples 32b lie in the order in which they were taken along the second row of the array; etc. Each sample is a real or imaginary number, and it is called a pixel. It consists of a certain number of bits, such as eight, twelve or sixteen.

Figure 4:
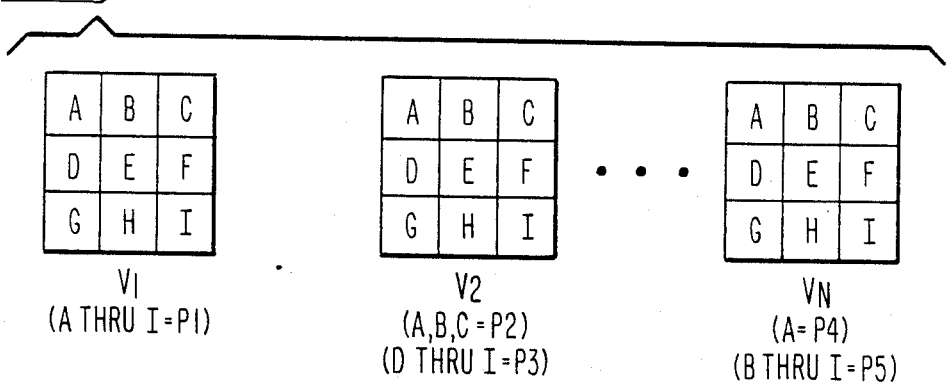
FIG. 4 shows the details of the unprocessed quantized vectors that are used in the method of FIG. 1.

Next, with reference to FIGS. 4 and 5, the details of how the array of pixels in FIG. 3 is converted into a smaller array of indexes i will be described. This conversion step utilizes the unprocessed vectors $V_1, V_2, \ldots V_N$ as shown in FIG. 4. And, FIG. 5 shows the array of indexes which results from the conversion step.

In FIG. 4, each of the unprocessed vectors $V_1, V_2, \ldots V_N$ consists of nine pixels which are arranged in a $3 \times 3$ array. And, all of the pixels in each unprocessed vector $V_1, V_2, \ldots V_N$ are preset to certain respective values. In FIG. 4, each of the pixels A thru I of vector $V_1$ is shown as having a value of P1; each of the pixels A, B, C of vector $V_2$ is shown as having a value of P2, while the remaining pixels have a value of P3; etc. These values to which the pixels in the unprocessed vectors are set represent anticipated values for the actual return signal samples.

Figure 5:
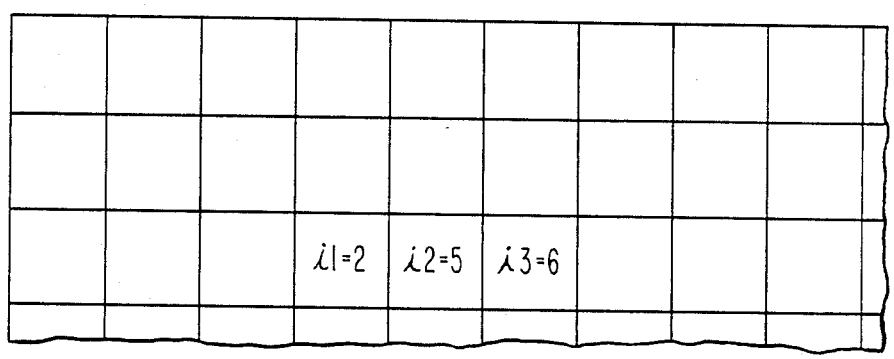
FIG. 5 shows an index array that is generated in the method of FIG. 1.

To convert the pixel array of FIG. 3 into the index array of FIG. 5, a $3 \times 3$ group of pixels G1 in the FIG. 3 array is compared to all of the unprocessed vectors $V_1, V_2, \ldots V_N$. This enables a determination to be made as to which of the vectors $V_1, V_2, \ldots V_N$ most closely matches that sample group G1. Once that determination is made, the index of the matching vector is placed in the FIG. 5 array at a location which corresponds to the location of the sample group G1 in the FIG. 3 array. Then the comparison steps are repeated for another sample group.

For example, in the index array of FIG. 5, indexes i1, i2, i3 respectively correspond to sample groups G1, G2, G3 in FIG. 3. Also, index i1 is shown as having a value 2; and that indicates that the unprocessed vector $V_2$ most closely resembles the samples in group G1. Similarly, index i2 is shown as having a value of 5 which indicates that sample group G2 most closely resembles vector $V_5$.

Figure 6:
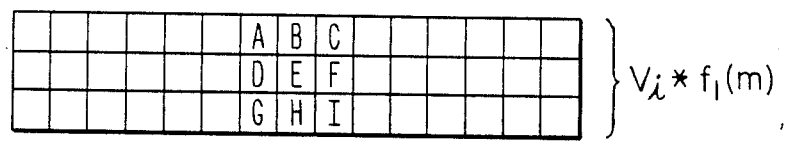
FIG. 6 shows a convolution operation that occurs just one time on the quantized vectors in the method of FIG. 1.
Figure 7:
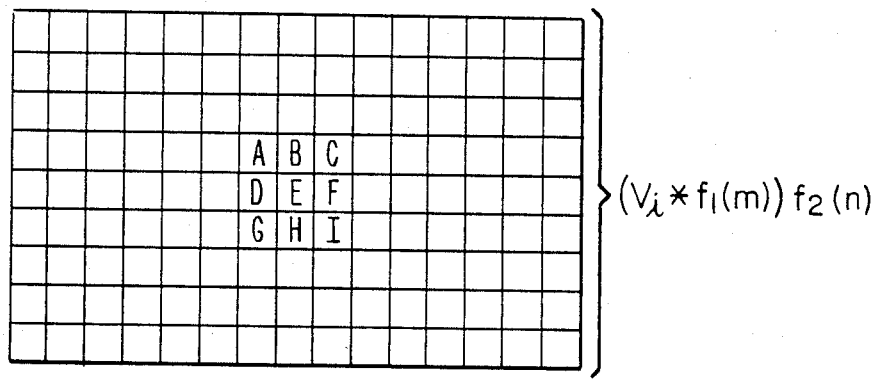
FIG. 7 shows another convolution operation that occurs just one time in the method of FIG. 1.

Considering now FIGS. 6 and 7, the detailed steps for forming the preprocessed vectors $V_i*f(m,n)$ will be described. Here, f(m,n) is assumed to be of the form $f_1(m)f_2(n)$. Initially, each row of vector $V_i$ is convolved with a sampled data function $f_1(m)$. This results in a new vector as shown in FIG. 6. Then, each column of the FIG. 6 vector is convolved with another sampled data function $f_2(n)$; and the result is shown in FIG. 7.

Preferably, function $f_1(m)$ is the sampled impulse response of a range filter. For example, when the transmitted pulse is the modulated chirp of the form given by Eq. 1 in FIG. 2, the corresponding range filter will have a sampled impulse response as given by Eq. 2 of FIG. 6. Also preferably, function $f_2(n)$ is a sampled impulse response of an azimuth filter. One such azimuth filter sampled impulse response is given by Eq. 3 in FIG. 7.

Note that in Eq. 3, the sampled impulse response $f_2(n)$ for the azimuth filter actually varies as a function of the range index m. Consequently, the total number of preconvolved FIG. 7 vectors which could be stored equals the number of unprocessed vectors times the number of sample points in the range filter. Preferably, however, the total number of preconvolved FIG. 7 vectors which are actually stored is reduced by holding the azimuth filter function constant at its average value over several values of m. For example, in Eq. 3, m can be set equal to 25, 75, 125, ... for all actual values of m between 1-50, 51-100, 101-150, ... respectively.

As FIG. 6 shows, the convolution step $V_i*f_1(m)$ increases the number of columns in the unprocessed vector $V_i$. If vector $V_i$ has $X_1$ columns and function $f_1(m)$ has $Y_1$ sample points, then the convolved vector will have $X_1 + Y_1 - 1$ columns. Similarly, FIG. 7 shows that the convolution step $V_1*[f_1(m)f_2(n)]$ increases the number of rows in the FIG. 6 result. If $V_i*f_1(m)$ has $X_2$ rows and function $f_2(n)$ has $Y_2$ sample points, then the convolved vector $V_i*[f_1(m)f_2(n)]$ will have $X_2 + Y_2 - 1$ rows. Preferably, the number of sample points in each of the functions $f_1(m)$ and $f_2(n)$ is between ten and one thousand.

Figure 8:
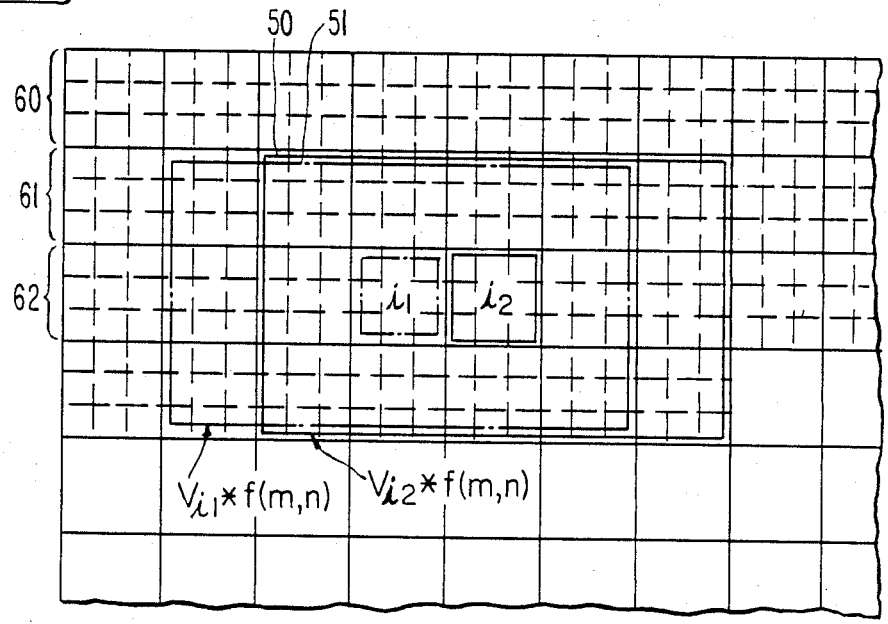
FIG. 8 shows an offset addition that occurs among selected preprocessed vectors in the method of FIG. 1.

Referring now to FIG. 8, it shows how the preprocessed vectors $V_i*f(m,n)$ which are read from memory M are added together in an offset fashion. There, the symbols i1 and i2 indicate the indexes which occur in row 3 column 4 and row 3 column 5 respectively of the index array of FIG. 5. Also, symbol $V_{i1}*f(m,n)$ indicates the preprocessed vector in memory M which results from performing the convolution steps of FIGS. 6 and 7 on the unprocessed vector $V_{i1}$. Similarly, symbol $V_{i2}*f(m,n)$ indicates the preprocessed vector in memory M which results from performing the convolution steps of FIGS. 6 and 7 on the unprocessed vector $V_{i2}$.

With vectors $V_{i1}*f(m,n)$ and $V_{i2}*f(m,n)$ being in offset alignment as shown in FIG. 8, an addition occurs between the pixels which overlap each other. Thus, for example, the pixel in row 1 column 4 of vector $V_{i1}*f(m,n)$ is added to the pixel of row 1 column 1 of vector $V_{i2}*f(m,n)$. These two pixels are indicated by reference numeral 50. Similarly, the pixel of row 1 column 5 of vector $V_{i1}*f(m,n)$ is added to the pixel of row 1 column 2 of vector $V_{i2}*f(m,n)$. This is indicated by reference numeral 51.

One such offset addition occurs for each of the preprocessed vectors whose index is in the FIG. 5 index array. Preferably, these additions occur in a left-to-right sequence for all of the preprocessed vectors whose indexes are in a single row of the FIG. 5 array; then the additions continue for all the preprocessed vectors whose indexes are in the next succeeding row; etc. By performing the offset additions in such a sequence, those pixels in FIG. 8 which are indicated by reference numeral 60 will become completely processed; next, the pixels which are indicated by reference numeral 61 will become completely processed; etc. Thus the resulting visual image will grow in size in an orderly sequence of three rows at a time.

A primary feature of the above described method is that it significantly reduces the time and complexity in producing visual images when compared to the prior art. This improvement occurs because in the disclosed method, no FFT operation or convolution operation is performed in real time on the samples of the radar return signals or on any decompressed radar return samples. In fact, no data decompression occurs at all, and no multiplications occur at all. In the disclosed method, only data compression and offset additions occur in real time. Consequently, the return signal samples can readily be processed as fast as they are accumulated.

Next, referring to FIG. 9, the architecture of an electronic system for producing visual images in real time in accordance with the above method will be described. It includes a digital computer 71, a memory 72, another digital computer 73, another memory 74, an amplitude detector 75, a CRT display 76, and the memory M in which the preprocessed vectors $V_i*f(m,n)$ are stored. All of these modules are interconnected via data buses 76a–76g as shown.

In operation, samples of the return signal are sent on bus 76a to computer 71. That computer temporarily stores the samples in memory 72, and it quantizes them into an array of indexes as was described in conjunction with FIG. 5. Those indexes i1, i2, ... are sent via bus 76c to computer 73. In response, computer 73 reads the corresponding preprocessed vectors $V_{i1}*f(m,n)$, $V_{i2}*f(m,n)$, ... from memory M, and it adds the read vectors together in accordance with the offset addition of FIG. 8. Results of that addition are sent via bus 76e to memory 74; and from there, they are sent via bus 76f to the amplitude detector 75 and then to the CRT 75 for visual display.

Figure 10:
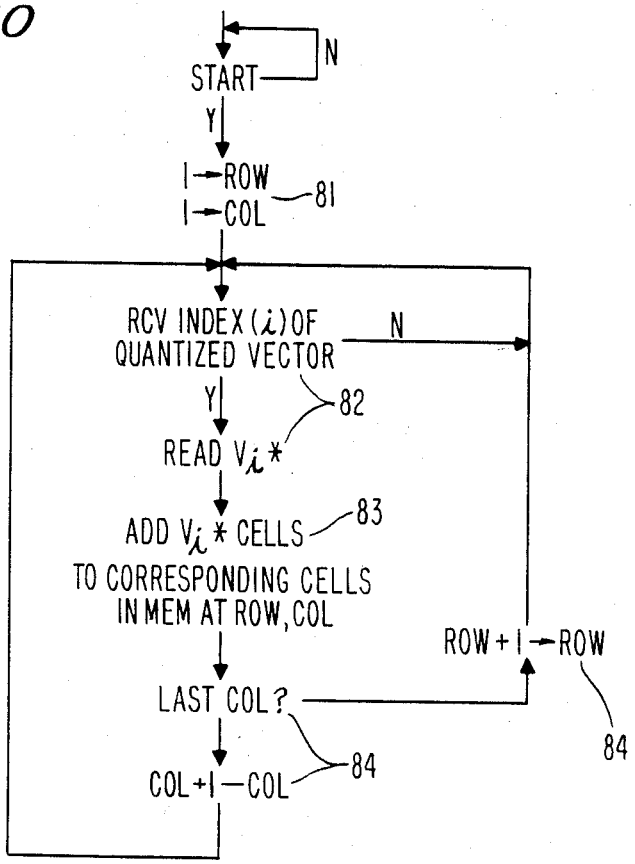
FIG. 10 shows a program of a computer in the FIG. 9 system.

A flow chart of the program which computer 73 executes in carrying out its above described task is shown in FIG. 10. To begin, the program waits for a START signal on bus 76c which indicates that the receipt of a sequence of indexes is about to begin. Upon receipt of the START signal, a row counter register and a column counter register in computer 73 are initialized to one. This is indicated by reference numeral 81. Then, the computer 73 waits for the receipt of an index signal.

When an index signal i is received, the program reads the corresponding preprocessed vector $V_i*f(m,n)$ from memory M. This is indicated by reference numeral 82. Then the program performs an offset addition on the pixels of that vector as was described in conjunction with FIG. 8, and it stores the resulting sum in memory 74. This is indicated by reference numeral 83. Next, the program updates the row and column registers such that they indicate the location, in the FIG. 5 index array, of the next index in sequence. This is indicated by reference numeral 84. Thereafter, when that next index is received, all of the above steps are repeated.

A preferred method for forming visual images via radar in accordance with the invention, as well as an electronic system for carrying out the steps of that method, have now been described in detail. In addition, however, many changes and modifications can be made to these details without departing from the nature and spirit of the invention.

For example, in the above described preferred method and embodiment, vector quantization is used to compress the samples of the radar return signal. But as an alternative, any other data compression method may be used which results in a finite number of indexes that correspond to the indexes of the preconvolved vectors.

As another example, in the above detailed description, each of the unprocessed vectors $V_1$ through $V_N$ consists of certain anticipated radar return samples which were grouped in a 3×3 array. But as an alternative, various other groupings can be used. For example, each unprocessed vector $V_i$ could be a 4×5 array of pixels, or a 7×6 array of pixels, etc.

As still another example, in the above detailed description, the sampled data function f(m,n) is a two-dimensional function. But as an alternative, the function by which each unprocessed vector $V_i$ is convolved can have any number of dimensions. And, to indicate such a function here and in the claims, the symbol f(m, ... ) is used.

Preferably, the total number of unprocessed vectors is from sixteen to ten thousand; the total number of samples in each unprocessed vector is from two to one hundred; and the total number of points in said sampled data function is from ten to fifty thousand. By these constraints, the size of the memory M which stores the preconvolved vectors becomes practical with today's technology. For example, suppose the number of unprocessed vectors $V_1$ thru $V_N$ is one hundred; each such vector is a $3 \times 3$ matrix; $f_1(m)$ is a fifty point function; and $f_2(n)$ is a fifty point function. Then, the total number of pixels in the preconvolved vectors equals $(100)(50+3-1)(50+3-1)$ or 270,400. Assuming twelve bits per pixel, this equals 3,244,800 bits; and today, a single DRAM chip holds one million bits.

Figure 9:
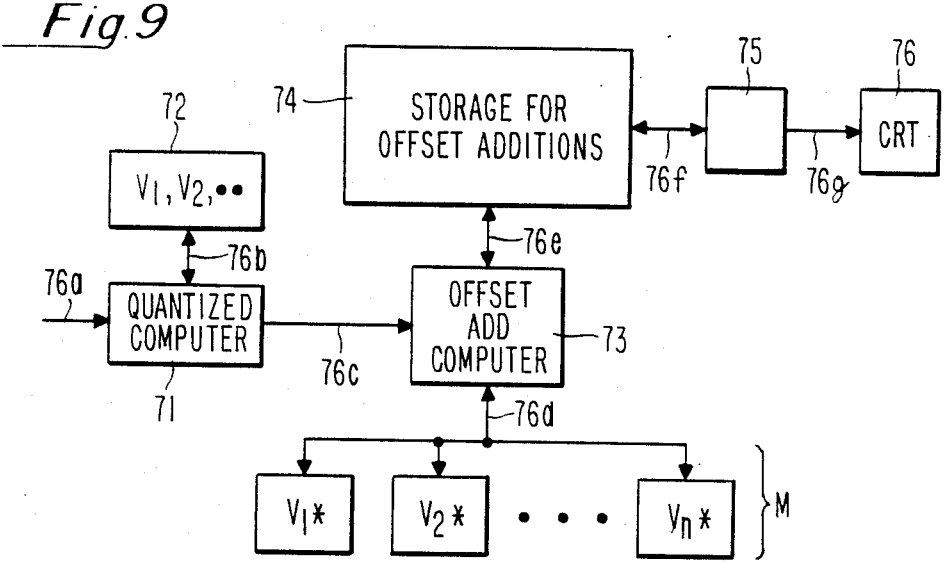
FIG. 9 shows an electronic system which carries out the method of FIG. 1.

As still another example, the single computer 73 in FIG. 9 can be replaced with multiple computers which operate in parallel. With that arrangement, the offset additions of FIG. 8 could be performed on several overlapping pixels simultaneously. Also, to reduce memory size for the case where $f_2(n)$ varies with m, the memory M of FIG. 9 can be double buffered. One buffer would be filled with the preconvolved vectors for the current range of indexes, while the other buffer will be updated with the preconvolved vectors for the next range of indexes.

Further, as yet another example, in the above detailed description, radar return signals were processed to produce visual images. But in general with this invention, linear signal processing can be performed in any system—radar or nonradar which previously performed FFT's or inverse FFT's or convolutions in real time. Such systems include, but are not limited to, speech signal processors, seismic signal processors, image signal processors, synthetic aperture sonar processors, infrared image processors, automatic image recognition systems, and spectrum analyzers.

Accordingly, it is to be understood that the invention is not limited to the above detailed embodiment but is defined by the appended claims.

What is claimed is:

1. An electronic system for processing sampled data input signals, which is comprised of:
    an electronic memory means which stores a set of preprocessed vectors $V_1 * f(m, \ldots)$ thru $V_n * f(m, \ldots)$ where $f(m, \ldots)$ is a sampled data function having any number of dimensions $m, \ldots$, $*$ is a convolution operator, and $V_1$ thru $V_N$ are a finite set of N unprocessed vectors each of which represents an anticipated group of input signal samples;
    a means for generating a sequence of samples from an input signal that is to be processed and for compressing said sequence of samples into a smaller sequence of index signals that correspond to the indexes 1 thru N of said unprocessed vectors;
    a means for receiving said smaller sequence of index signals and for reading form said memory means, those preprocessed vectors whose indexes match the received index signals; and,
    a means for adding together the read preprocessed vectors while maintaining a predetermined offset between them as they are added.

2. A system according to claim 1 wherein said means for reading and said means for adding operate sequentially on one preprocessed vector at a time.

3. A system according to claim 1 wherein said means for reading and said means for adding operate in parallel on multiple preprocessed vectors at a time.

4. A system according to claim 1 wherein the number of preprocessed vectors ranges from sixteen to ten thousand.

5. A system according to claim 1 wherein said predetermined offset which is maintained between the preprocessed vectors equals the size and shape of an unprocessed vector.

6. A system according to claim 1 wherein said sampled data function $f(m, \ldots)$ is from ten to fifty thousand data points in size.

7. A system according to claim 1 wherein said sampled data function includes the sampled impulse response of a range filter.

8. A system according to claim 1 wherein said sampled data function includes the sampled impulse response of an azimuth filter.

9. A system according to claim 1 wherein said sampled data function is of a form $f_1(m)f_2(n)$, and wherein $f_1(m)$ is convolved by row with each vector $V_1$ thru $V_n$ while $f_2(n)$ is convolved by column with each result from such $f_1(m)$ convolution.

10. A system according to claim 1 wherein each of said unprocessed vectors $V_1$ thru $V_n$ approximates from two samples to one hundred samples of said input signal.

11. A system according to claim 1 wherein said input signal is a return signal of a radar pulse.

12. A system according to claim 11 wherein said predetermined offset which is maintained between the preprocessed vectors equals the size and shape of an unprocessed vector.

13. A system according to claim 12 wherein said sampled data function is of a form $f_1(m)f_2(n)$, and wherein $f_1(m)$ is convolved by row with each vector $V_1$ thru $V_N$ while $f_2(n)$ is convolved by column with each result from such $f_1(m)$ convolution.

14. A system according to claim 13 wherein said sampled data function $f_1(m)$ is the sampled impulse response of a range filter.

15. A system according to claim 14 wherein said sampled data function $f_2(n)$ is the sampled impulse response of an azimuth filter.

16. A system according to claim 15 wherein said means for reading and said means for adding operate sequentially on one preprocessed vector at a time.

17. A system according to claim 15 wherein said means for reading and said means for adding operate in parallel on multiple preprocessed vectors at a time.

* * * * *

UNITED STATES PATENT AND TRADEMARK OFFICE
CERTIFICATE OF CORRECTION

PATENT NO. : 4,977,604

DATED : December 11, 1990

INVENTOR(S) : Douglas M. Chabries, et al

It is certified that error appears in the above-identified patent and that said Letters Patent is hereby corrected as shown below:

On the title page Assignee should read

--(73) Assignee: -- Brigham Young University, Provo, Utah

Signed and Sealed this

Twelfth Day of January, 1993

Attest:

DOUGLAS B. COMER

*Attesting Officer*     Acting Commissioner of Patents and Trademarks